United States Patent
Tomioka et al.

(10) Patent No.: US 9,507,211 B2
(45) Date of Patent: Nov. 29, 2016

(54) LIQUID CRYSTAL DISPLAY DEVICE

(71) Applicant: Japan Display Inc., Tokyo (JP)

(72) Inventors: Yasushi Tomioka, Tokyo (JP); Noboru Kunimatsu, Tokyo (JP); Hidehiro Sonoda, Tokyo (JP); Yosuke Hyodo, Tokyo (JP)

(73) Assignee: Japan Display Inc., Tokyo (JP)

( * ) Notice: Subject to any disclaimer, the term of this patent is extended or adjusted under 35 U.S.C. 154(b) by 154 days.

(21) Appl. No.: 14/474,511

(22) Filed: Sep. 2, 2014

(65) Prior Publication Data

US 2015/0062515 A1 Mar. 5, 2015

(30) Foreign Application Priority Data

Sep. 3, 2013 (JP) .................................. 2013-182119

(51) Int. Cl.
  *G02F 1/1333* (2006.01)
  *G02F 1/1337* (2006.01)
  *G02F 1/1339* (2006.01)

(52) U.S. Cl.
  CPC ... *G02F 1/133788* (2013.01); *G02F 1/133345* (2013.01); *G02F 1/13394* (2013.01); *G02F 2001/133388* (2013.01)

(58) Field of Classification Search
  CPC .............................................. G02F 1/133345
  See application file for complete search history.

(56) References Cited

U.S. PATENT DOCUMENTS

| 2007/0091247 | A1 | 4/2007 | Onda | |
|---|---|---|---|---|
| 2008/0018848 | A1 | 1/2008 | Iwato et al. | |
| 2015/0131041 | A1* | 5/2015 | Moriwaki | G02F 1/1337 349/106 |
| 2015/0185539 | A1* | 7/2015 | Senokuchi | H05B 33/04 349/58 |
| 2015/0192816 | A1* | 7/2015 | Shih | G02F 1/1339 349/42 |

FOREIGN PATENT DOCUMENTS

| JP | 2001-330837 | 11/2001 |
|---|---|---|
| JP | 2007-114586 | 5/2007 |
| JP | 2008-026345 | 2/2008 |

* cited by examiner

*Primary Examiner* — Timothy L Rude
(74) *Attorney, Agent, or Firm* — Typha IP LLC (57) ABSTRACT

The invention provides a liquid crystal display device which is highly reliable even with a slim frame area. Ina liquid crystal display device having a display area and a frame area, the frame area includes, in an area close to the display area, a flat portion where an organic insulation film, a transparent conductive film, and an alignment film are stacked in this order and, in an area away from the display area, a groove structure formed in the organic insulation film, the groove structure being continuous surrounding the display area. The organic insulation film is less wettable than the transparent conductive film by the alignment film ink.

15 Claims, 6 Drawing Sheets

LIQUID CRYSTAL DISPLAY DEVICE

CLAIM OF PRIORITY

The present application claims priority from Japanese patent application JP 2013-182119 filed on Sep. 3, 2013 the content of which is hereby incorporated by reference into this application.

FIELD OF THE INVENTION

The present invention relates to a liquid crystal display device.

BACKGROUND OF THE INVENTION

A liquid crystal display device includes a TFT substrate on which pixels each having a pixel electrode and a thin-film transistor (TFT) are formed in a matrix pattern, a counter substrate (CF substrate) on which color filters, etc. are formed in positions corresponding to the pixel electrodes on the TFT substrate, and a sealant sealing the outer peripheries of the two substrates to keep liquid crystals sealed between the two substrates.

The TFT substrate and the counter substrate each have an alignment film which has a liquid crystal alignment control function for controlling liquid crystal molecule alignment and orientation when a potential difference occurs between the pixel electrodes and the counter electrodes. The alignment films included in the TFT substrate and the counter substrate are each formed in an interface between the main surface of the corresponding substrate and the liquid crystal material (liquid crystal layer) formed over the main surface. The alignment films are each given an alignment control function by being subjected to, for example, rubbing processing and polarized light irradiation. Besides a flexographic printing method, an ink-jet printing method is also used to form an alignment film over the surface of each of the TFT substrate and the counter substrate (see Japanese Patent Laid-Open Nos. 2007-114586, 2008-026345, and 2001-330837).

SUMMARY OF THE INVENTION

In the field of liquid crystal display devices, a tendency is toward slimmer frame areas and, in terms of alignment films to be formed in a liquid crystal display device, pattern accuracy improvement is required. Since ink can be applied with higher positional accuracy by an ink-jet method than by a flexographic printing method, the present inventors studied application of the ink-jet method, considering that the ink-jet method would be instrumental in realizing liquid crystal display devices with accurately positioned patterns formed consuming less ink. In the case of ink-jet printing, however, the ink used is lower in viscosity and easier to flow than the ink used in flexographic printing, so that it is difficult to secure printing accuracy at an outer periphery of an ink-applied pattern. The present inventers found by chance that an opening formed through a material which is low in wettability by a certain liquid does not allow easy ingress of the liquid therethrough. Hence, the present inventors considered utilizing the observed phenomenon for preventing a printing ink from spreadingly flowing. Japanese Patent Laid-Open No. 2007-114586 was found as a result of investigating existing techniques from the standpoint of wettability (hydrophilicity/hydrophobicity). In the above patent document, a liquid crystal display device is disclosed which includes alignment films formed by a contactless alignment film printing method in which printing is performed without contacting the target substrate. The contactless alignment film printing method is adopted to improve the positional accuracy (patterning accuracy) of alignment film printing and the alignment film thickness uniformity. In the liquid crystal display device including alignment films formed by the contactless alignment film printing method, a printing control pattern is provided, over each substrate, between the sealant and the display area so as to control wet-spreading of the alignment film material and, thereby, make the alignment film thickness uniform. In the patent document, it is stated that the printing control patterns may be formed as highly water-repellant regions or may be formed to include micro-concave or micro-convex portions or micro-columnar portions. In Japanese Patent Laid-Open Nos. 2008-026345 and 2001-330837, nothing is mentioned about alignment film wettability.

However, even if the technique disclosed in Japanese Patent Laid-Open No. 2007-114586 is applied in fabricating a liquid crystal display device with a slim frame area and a pattern of alternating concave and convex portions is generated using a material with high repellency against the alignment film material, the alignment film ink seeping out through between the alternating concave and convex portions can make positional control inadequate for edge portions of the alignment film.

An object of the present invention is to provide a liquid crystal display device which is highly reliable even with a slim frame area.

According to an embodiment of the present invention, a liquid crystal display device includes a first substrate, a second substrate and a seal for sealing liquid crystals between the first substrate and the second substrate. The first substrate has a display area in a center portion thereof and a frame area surrounding the display area as seen from perpendicularly above. The frame area of the first substrate has a flat portion formed in an area close to the display area. The flat portion includes a film stack which includes an organic insulation film, a transparent conductive film, and an alignment film stacked in this order. The frame area of the first substrate also has a groove structure formed in the organic insulation film in an area away from the display area. The groove structure is continuous surrounding the display area.

According to an embodiment of the present invention, a liquid crystal display device includes a display area and a frame area surrounding the display area. The frame area has a flat portion formed in an area close to the display area. The flat portion includes a film stack which includes an organic insulation film, a transparent conductive film, and an alignment film stacked in this order. The frame area also has a groove structure formed in the organic insulation film to be in an area away from the display area. The groove structure surrounds the display area. The groove structure includes a plurality of grooves having discontinuous portions. The discontinuous portions are formed such that distance L between any two discontinuous portions of any two adjacent ones of the grooves is larger than distance S between the two adjacent grooves.

According to the present invention, a liquid crystal display device which is highly reliable even with a slim frame area can be provided.

DESCRIPTION OF THE PREFERRED EMBODIMENTS

The present inventors have studied a structure of a liquid crystal display device in which edge (outer peripheral) portions of patterns formed by applying an alignment film solution (an alignment film ink for forming an alignment film) can be positioned with high accuracy. As a result of the study, it has been found that inhibiting the flow of ink by taking into consideration shapes and wettability of parts making up the liquid crystal display device makes it possible to secure printing accuracy for outer peripheral portions of patterns.

Figure 1:
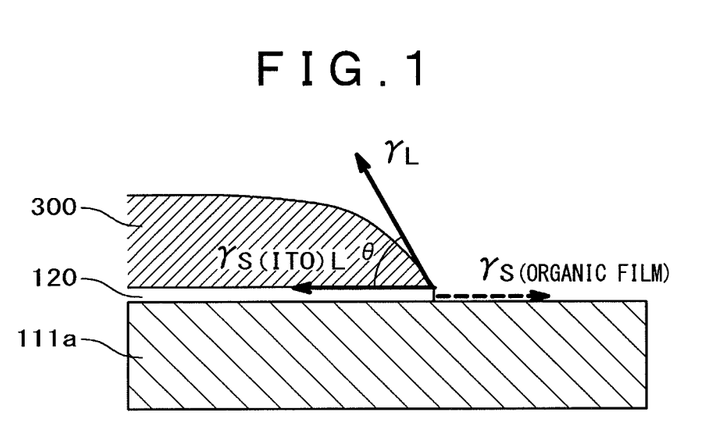
FIG. 1 is a schematic sectional view for explaining the surface energy at an edge portion of an alignment film ink applied over a transparent conductive film (ITO) which is formed over an organic insulation film.
Figure 2A:
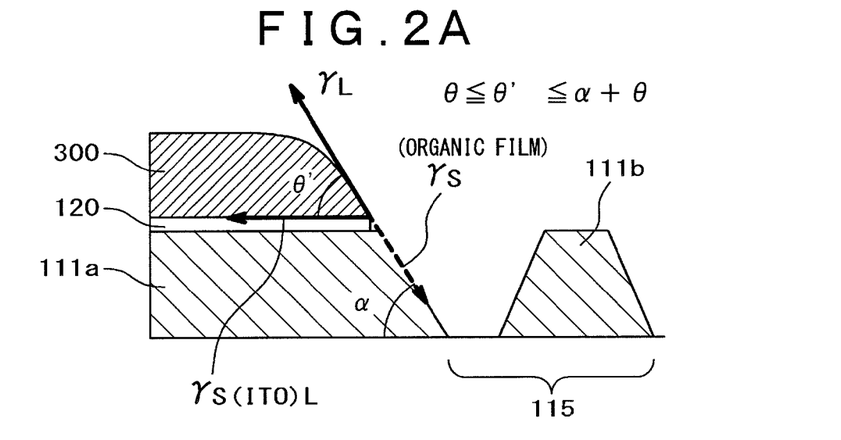
FIG. 2A is a schematic sectional view for explaining the surface energy at an edge portion of an alignment film ink applied over the ITO that is formed over an organic insulation film having a groove formed along an edge portion of the ITO.

FIG. 1 is a schematic sectional view for explaining the surface energy (surface tension) at an edge portion of an alignment film ink 300 applied over a transparent conductive film (ITO) which is formed over an organic insulation film using an existing technique. FIG. 2A is a schematic sectional view for explaining the surface energy at an edge portion of an alignment film ink 300 applied over the ITO that is formed over an organic insulation film having a groove formed along an edge portion of the ITO according to an embodiment of the present invention. Referring to FIG. 1, the surface energy at the edge portion of the alignment film ink 300 is balanced as expressed by equation (1).

$$\gamma s(ITO)L + \gamma L \cos\theta = \gamma s(\text{organic film}) \qquad (1)$$

where γs (ITO) L represents the surface energy at an ITO/alignment film ink interface, γL represents the surface energy at an alignment film ink/air interface, and γs (organic film) represents the surface energy at an organic film/air interface. Referring to FIG. 2A, the surface energy of the alignment film ink 300 at the edge portion on the corresponding longitudinal side of the groove is balanced as expressed by equation (2).

$$\gamma s(ITO)L + \gamma L \cos\theta' = \gamma s(\text{organic film}) \qquad (2)$$

Figure 2B:
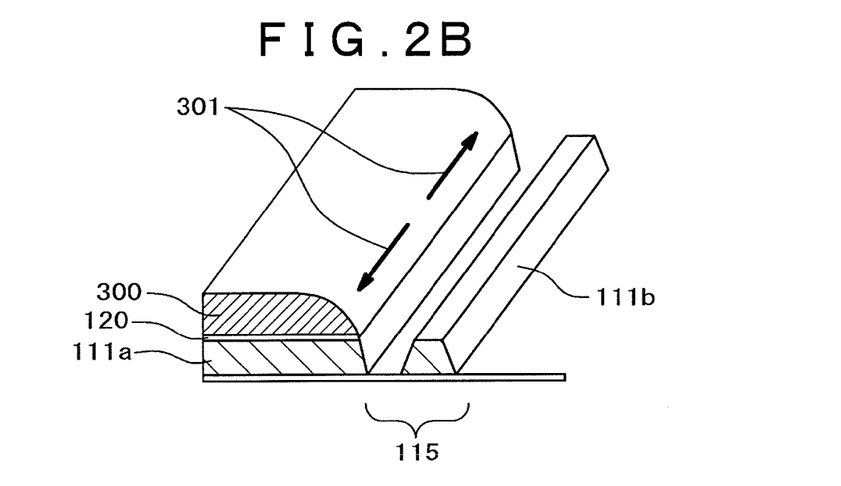
FIG. 2B is a bird's eye view for explaining wet-spreading of an alignment film ink in the structure shown in FIG. 2A.
Figure 2C:
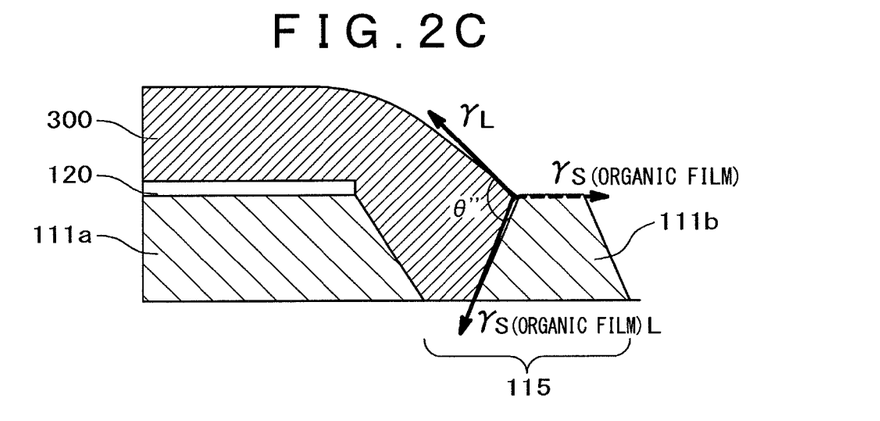
FIG. 2C is a schematic sectional view for explaining spreading of an alignment film ink provided in an excessive amount in the structure shown in FIG. 2A.

At the stepped edge portion shown in FIG. 2A, γs (organic film) is smaller than γs (ITO) because of the effects of groove inclination angle α and the organic insulation film surface, and apparent contact angle θ' is larger than angle θ observed at an end portion of a flat ITO surface (θ≤θ'≤α+θ). Therefore, as shown in FIG. 2B, the alignment film ink 300 wettingly spreads in directions 301 along the longitudinal groove edge on the corresponding side. This prevents the alignment film ink 300 from wettingly spreading in the direction of crossing the groove. When the alignment film ink 300 is excessive in amount, the alignment film ink 300 spreads into the groove, but, as shown in FIG. 2C, the alignment film ink 300 then wettingly spreads along the top end portion of the bank (projecting portion) on the other side of the groove. This inhibits the alignment film ink 300 from wettingly spreading across the groove.

In this way, the accuracy of alignment film ink application for pattern formation can be improved and, in a liquid crystal display device, the distance between the display area and the sealed portion can be reduced. This is, therefore, effective in making the frame area of a liquid crystal display panel slimmer. In cases where an alignment film bulges at a peripheral portion thereof causing a stepped portion to be formed, photo-alignment technology may be used for improved alignment processing.

In the following embodiments of the present invention, grooves are formed, over the TFT substrate, to be continuous from an organic insulation film and to surround the four sides of the display area. With the grooves provided, spreading of the alignment film ink can be effectively inhibited compared with cases in which, with no groove like the above-described ones formed, merely a low wettability material is provided to inhibit spreading of the alignment film ink. Spreading of the alignment film ink can be inhibited more by forming the side walls of the grooves to be closer to being vertical. Among the materials making up a liquid crystal display device, the ITO (with a contact angle θ of 3 degrees) is high in wettability. The acrylic transparent organic insulation film (with a contact angle θ' of 20 degrees) is, on the other hand, low in wettability. When the side wall inclination angle α of a groove is 60 degrees, the contact angle of the alignment film ink at a groove edge portion can be increased to 63 to 80 degrees. This further inhibits spreading of the alignment film ink. Furthermore, having organic silane molecules (R—SiX where R=alkyl group and X=Cl, OCH3 and OC2H5) interfacially adsorbed onto the ITO film, inorganic insulation film and organic insulation film, then dehydratively condensing them can make the surface of R—Si—O— oxide water repellant so as to repel the alignment film ink more. This makes it possible to more effectively inhibit the alignment film ink from wettingly spreading. The surface treatment for water repellency can be applied to ITO, SiO, SiNx or even to an organic insulation film. In the case of an organic insulation film, the effect of surface treatment can be enhanced by treating the film surface with ozone (O3) using atmospheric-pressure plasma or ultraviolet rays for surface quality improvement before treating the surface with a surfactant as described above.

On the counter substrate side (on the CF substrate side), spreading of the alignment film ink can be inhibited by forming a frame-shaped bank (wall-like projecting portion) using an organic insulation film for forming columnar spacers. The present invention can be applied not only in cases where ink-jet printing is performed but also in cases where alignment films are formed by flexographic printing.

In the following, the present invention will be described in detail based on exemplary embodiments. Between the following embodiments, like reference numerals denote like components.

First Embodiment

A first embodiment of the present invention will be described below with reference to drawings.

Figure 3:
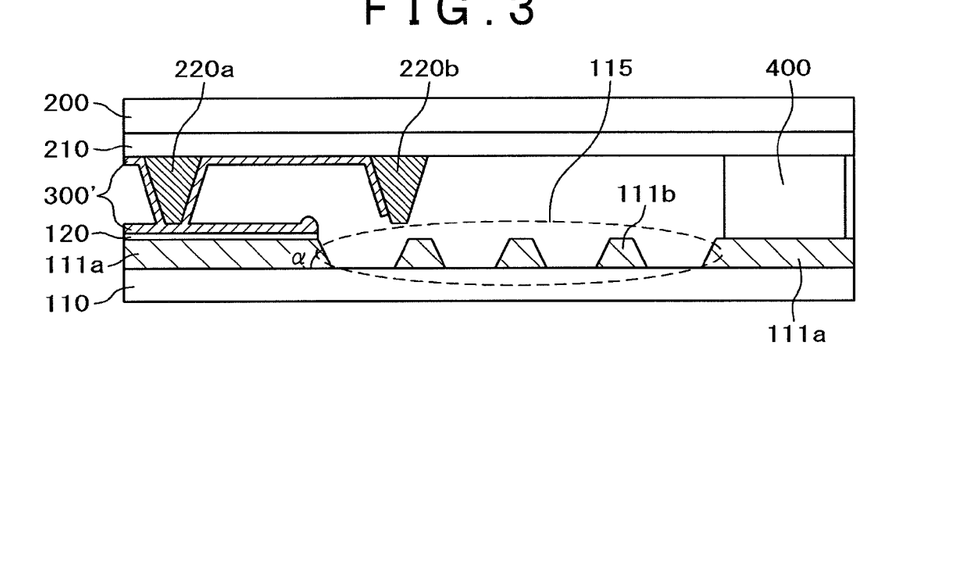
FIG. 3 is a schematic sectional view of a frame area of a liquid crystal display device, with no excessive amount of alignment film ink provided therein, according to a first embodiment of the present invention.

FIG. 3 is a schematic sectional view of a frame area of a liquid crystal display device, with no excessive amount of alignment film ink provided therein, according to a first embodiment of the present invention. According to the present embodiment, a groove structure 115 including at least one groove (concave portion) (quadruple grooves are included in the present embodiment) is formed in a transparent organic insulation film 111a under an ITO 120 which is formed over a TFT substrate 110 having TFTs formed thereover such that the groove structure 115 surrounds the outer periphery of the display area. The flat portion (left side portion as seen in FIG. 3) near the display area of the transparent organic insulation film 111a is covered with a transparent conductive film (ITO or IZO) 120. The inclined side portions and bottom portion of each groove (concave portion) are formed of the organic insulation film. This groove structure inhibits the alignment film ink from wettingly spreading. Whereas the flat portion has a surface with high wettability formed of a transparent conductive film (ITO or IZO) or an inorganic insulation film, the portion (portion away from the display area, i.e. right side portion as seen in FIG. 3) outward of the inclined side portion on the flat portion side of the groove adjoining the flat portion has a surface with low wettability formed of, for example, an organic insulation film. In this way, the expandability (wetting spreadability) at the edge portion of the alignment film to be formed by ink application over the flat portion can be reduced. In the present embodiment, the transparent organic insulation film 111a is about 2 μm thick, the ITO is about 50 nm thick, the alignment film 300' is about 100 nm thick, the side wall inclination angle α of each groove is about 60 degrees, and each groove and the protrusions (projecting portions) along each groove are about 20 μm wide each. Plural grooves to surround the display area can be formed by forming the groove structure 115 such that plural wall-like portions (projecting portions) of the transparent organic insulation film 111b are left unremoved.

A counter substrate (CF substrate) 200 having color filters and a black matrix formed thereover is covered with an overcoat (OC) 210. Over the OC 210, a bank (projecting portion) 220b is formed like a frame surrounding the display area. The bank 220b is formed making use of the organic insulation film that is used to form the columnar spacers 220a over the OC 210 to define the distance between the TFT substrate and the CF substrate. This structure inhibits the alignment film ink from wettingly spreading. The overcoat is about 1 μm thick, the columnar spacers 220a and the bank 220b surrounding the display area are about 4 μm high, and the alignment film is about 100 nm thick. The counter substrate and the TFT substrate are sealingly joined by a sealant 400.

Figure 4:
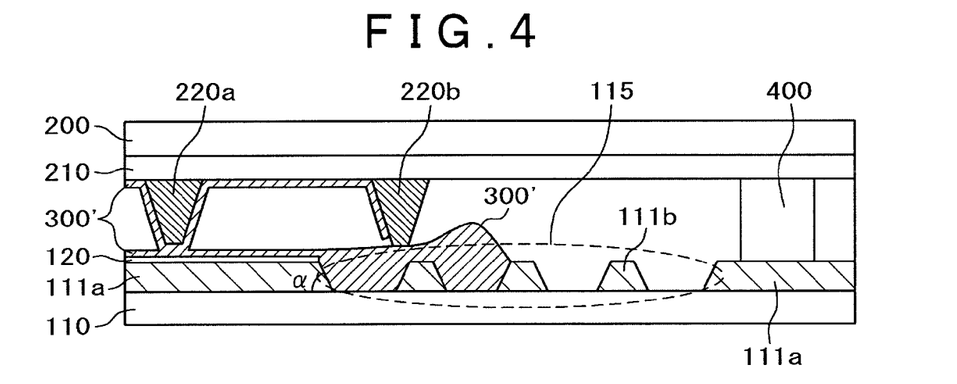
FIG. 4 is a schematic sectional view of a frame area of the liquid crystal display device, with an excessive amount of alignment film ink provided therein, according to the first embodiment of the present invention.

Next, an example case in which the alignment film ink is excessive in amount will be described with reference to FIG. 4. In cases where the alignment film ink is excessive in amount, spreading of the alignment film ink is prevented by the surface energy difference between the transparent conductive film 120 and the transparent organic insulation film 111a and a groove structure 115 which includes multiple grooves and protrusions (projections), and which is formed to surround the outer periphery of the display area. In this way, the patterns formed by applying ink can have accurately positioned edges. If the groove structure 115 is not provided, the edge portion of the alignment film ink ranges from 1 to 2 mm in width, that is, the edge portion cannot be accurately positioned. When the groove structure of the present embodiment is used, the edge portion of the alignment film ink can be positioned as desired within a width of 0.2 mm. In cases where inhibiting the alignment film ink from wettingly spreading results in degrading the flatness of the alignment film 300' as shown in FIG. 4, adopting a photo-alignment film will enable favorable alignment processing, so that display failure does not easily occur.

Figure 5:
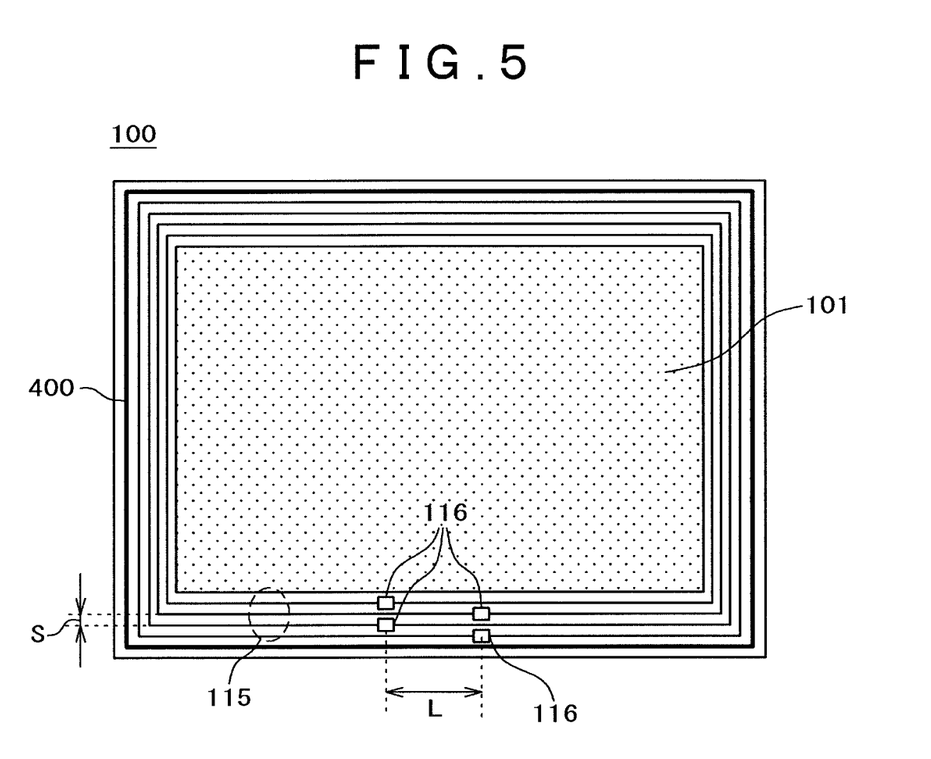
FIG. 5 is a schematic plan view of the liquid crystal display device according to the first embodiment.

Next, the planar arrangement of the groove structure 115 will be described with reference to FIG. 5. FIG. 5 is a schematic plan view of a liquid crystal display device 100 according to the present embodiment. The groove structure 115 is provided to surround the outer periphery of a display area 101. The groove structure 115 preferably includes plural grooves each formed to be continuous around the outer periphery of the display area 101. In cases where each groove cannot be formed to be continuous, for example, with each groove being discontinuous at least at a portion thereof along one of the four sides of the display area 101, the discontinuous portions of the plural grooves along a side of the display area 101 are to be arranged such that, as shown in FIG. 5, distance L between the discontinuous portions of any two adjacent grooves is smaller than distance S between the two adjacent grooves (i.e. L>S). This can inhibit the alignment film ink from leaking to outside through the discontinuous portions of the grooves, so that dimensional variations in the outer peripheral portion of the alignment film ink can be prevented. For this, it is effective to provide three or more grooves (at least triple grooves). In FIG. 5, reference numeral 116 denotes discontinuous portions of the grooves. Where the above dimensional relationship (L>S) is maintained between grooves, the grooves can be discontinuous at plural portions. As long as the above dimensional relationship is maintained between the grooves, any two adjacent grooves may include two discontinuous portions, one along a side and the other along another side of the display area 101. The liquid crystal display device has a drive circuit unit, not shown, and the drive circuit unit is connected by wiring, not shown, formed under the organic insulation film to the TFTs corresponding to the pixels in the display area.

Figure 6:
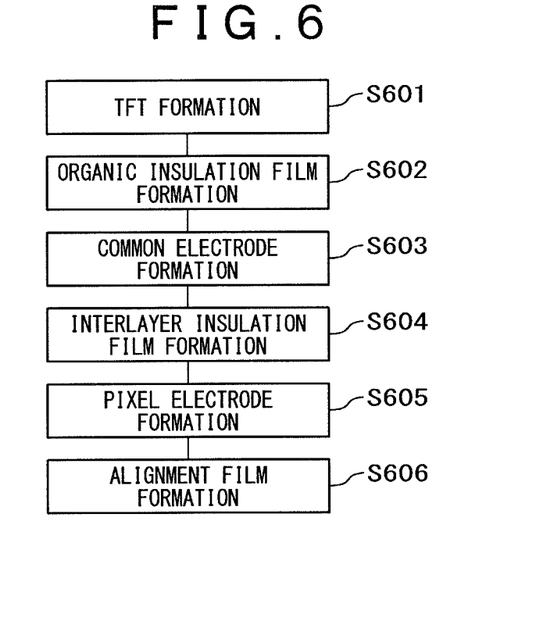
FIG. 6 is a flowchart for explaining a fabrication process of the TFT substrate included in the liquid crystal display device according to the first embodiment of the present invention.
Figure 7:
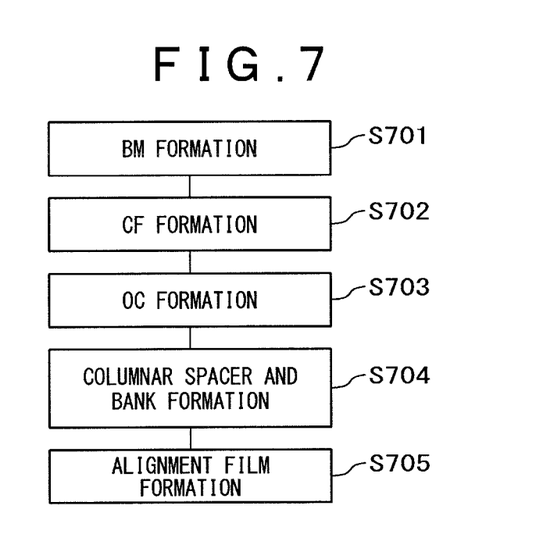
FIG. 7 is a flowchart for explaining a fabrication process of the counter substrate (CF substrate) included in the liquid crystal display device according to the first embodiment of the present invention.

With reference to FIGS. 6 and 7, the procedures for fabricating the TFT substrate and the CF substrate will be described in the following. Both the TFT substrate and the CF substrate can be fabricated using publicly known technology. Referring to FIG. 6, in the TFT substrate fabrication procedure, thin film transistors (TFTs) are formed first. To form the TFTs, various layers are formed using such techniques as sputtering and chemical vapor deposition. The layers formed include a polysilicon layer for forming channel, source, and drain regions, an insulation film layer for gate insulation, a metal layer for forming gate lines used as scanning signal lines, an insulation film layer in which contact holes for connection to drain regions are formed, and a metal layer for forming video signal lines connected to drain regions. The layers formed are processed, for example, by photolithography to generate required patterns (TFT formation step S601). Next, an organic insulation film is formed over the TFTs thus formed, for example, by spin coating or slit coating, and the organic insulation film is processed, for example, by photolithography for patterning to form contact holes for electrical connections between the source regions and pixel electrodes of the TFTs (organic insulation film formation step S602). At this time, a groove structure is also formed to surround the outer periphery of the display area. Subsequently, over the patterns thus formed, ITO electrodes to be used as common electrodes are formed, then desired ITO patterns are formed based on the display area structure and by taking into account the groove structure around the display area (common electrode formation step S603). Next, an inorganic insulation film, for example, an SiN film or an SiO2 film to be used as an interlayer insulation film is formed over the common electrode layer, for example, by a CVD method, and the film is processed to form desired patterns based on the display area structure and by taking into account the groove structure around the display area (interlayer insulation film formation step S604). Subsequently, an ITO film for forming pixel electrodes is formed over the interlayer insulation film layer, for example, by sputtering. The ITO film is processed to generate a comb-shaped slit pattern inside the display area and a desired pattern over the groove structure surrounding the outer periphery of the display area (pixel electrode formation step S605). After the pixel electrodes are formed by patterning, an alignment film is formed by applying an ink by an ink-jet method. The alignment film formed is subjected to leveling to make its surface flat and is then imidized by burning. Subsequently, the alignment film is subjected to rubbing or photo-alignment so as to provide the alignment film with an alignment force and have the liquid crystals aligned in a certain direction (alignment film formation step S606). The alignment film can also be formed by a printing method.

In the counter substrate (CF substrate) fabrication procedure, first, as shown in FIG. 7, a light-blocking black matrix (BM) layer is formed, and the BM layer is processed, for example, by photolithography to form a desired matric pattern (BM formation step S701). Next, over the BM layer, red (R), green (G), and blue (B) (or blue plus white) color filter resist materials are sequentially formed by spin coating or slit coating to be then processed, for example, by photolithography for patterning (CF formation step S702). Next, over the color filter, an overcoat of a transparent organic insulation film is formed, for example, by spin coating or slit coating (OC formation step S703). Subsequently, over the overcoat, a transparent organic insulation film is formed, for example, by spin coating or slit coating. Then, by patterning the transparent organic insulation film, columnar spacers are formed at desired locations (mainly in the display area) and a projecting frame-shaped bank is formed to surround the outer periphery of the display area (columnar spacer and bank formation step S704). After the columnar spacers and the bank are formed by patterning, an alignment film is formed by applying ink by a printing method or an ink-jet method. The alignment film is leveled to make its surface flat and is then imidized by burning. Subsequently, the alignment film is subjected to rubbing or photo-alignment so as to provide the alignment film with an alignment force and have the liquid crystals aligned in a certain direction (alignment film formation step S705).

A liquid crystal display device like the one shown in FIGS. 3 and 4 can be fabricated by holding liquid crystals between the TFT substrate and the CF substrate fabricated using the above procedures and applying a sealant to the TFT substrate and the CF substrate to keep the liquid crystals sealed between them.

According to the present embodiment, grooves formed in an organic insulation film are provided, each being formed to be continuous to surround the display area. This makes it possible to provide a liquid crystal display device which is highly reliable even with a slim frame area. Also, even if the grooves have discontinuous portions, the alignment film ink can be prevented from leaking to outside through such discontinuous portions as long as distance L between any two discontinuous portions of any two adjacent grooves is larger than distance S between the two adjacent grooves (L>S). Thus, dimensional variations in the outer peripheral portion of the alignment film ink can be prevented.

The grooves to be included in the groove structure to be formed in the organic insulation film may be formed using an existing technique, for example, a halftone exposure technique in which, without completely removing the organic insulation film from the bottom of each groove, part of the organic insulation film at the bottom of each groove is left unremoved. The grooves included in the groove structure may also be such that the organic insulation film is completely removed from the bottoms of some grooves whereas the organic insulation film is left unremoved on the bottoms of other grooves. When a groove is formed by patterning an organic insulation film, there are cases in which the upper flat portion adjoining the groove is gently transformed into an inclined side portion of the groove with no clear-cut border formed between them. The edge portion of the transparent conductive film or inorganic insulation film may be located over such a gently transformed portion (where inclination gently changes).

Second Embodiment

A liquid crystal display device according to a second embodiment of the present embodiment will be described with reference to FIG. 8. What has been described about the first embodiment, if not described in connection with the present embodiment, applies to the present embodiment except under exceptional circumstances.

Figure 8:
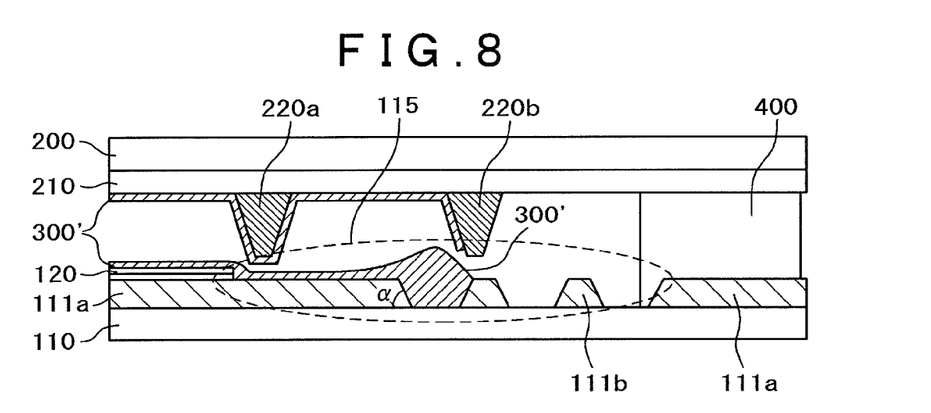
FIG. 8 is a schematic sectional view of a frame area of a liquid crystal display device according to a second embodiment of the present invention.

FIG. 8 is a schematic sectional view of a frame area of a liquid crystal display device according to the present embodiment. The TFT substrate has a groove structure 115 formed using a transparent organic insulation film 111*a* making up a lower layer. The groove structure 115 includes at least one groove (concave portion) formed to surround the outer periphery of the display area (triple grooves are provided in the present embodiment). In the flat portions near the display area, a boundary region between the transparent conductive film (ITO or IZO) 120 or an inorganic insulation film (SiNx or SiO) and the organic insulation film 111*a* is formed. The inclined side portions and bottom portion of each groove (concave portion) are formed of the inorganic insulation film. This groove structure restricts wet-spreading of the alignment film ink. The surface energy difference between the ITO and the organic insulation film in the boundary region and the multiple grooves (concave portions) (triple grooves in the present embodiment) formed to surround the outer periphery of the display area inhibit the alignment film ink from wettingly spreading, so that edge position controllability can be improved for the patterns formed by applying ink. Referring to FIG. 8, angle α is about 50 degrees, and the grooves and projecting portions are about 30 μm wide each.

If the groove structure 115 is not provided, the edge portion of the alignment film ink ranges from 1 to 2 mm in width, that is, the edge portion cannot be accurately positioned. When the groove structure of the present embodiment is used, the edge portion of the alignment film ink can be positioned as desired within a width of 0.1 mm. In cases where inhibiting the alignment film ink from wettingly spreading results in degrading the flatness of the alignment film 300' as shown in FIG. 8, adopting a photo-alignment film will enable favorable alignment processing.

The CF substrate is structured such that a bank (wall-like projecting portion) 220b is formed, using the organic insulation layer for forming columnar spacers, to surround the outer periphery of the display area. In this structure, the alignment film ink is inhibited from wettingly spreading.

According to the present embodiment, grooves formed in an organic insulation film are provided, each groove being formed to be continuous to surround the display area. This makes it possible to provide a liquid crystal display device which is highly reliable even with a slim frame area. Also, generating a surface energy difference between the ITO film and the organic insulation film on the flat portion on the inner side (on the display area side) of the groove structure enhances the effect of inhibiting the alignment film ink from wettingly spreading. This improves the edge position controllability for the alignment film ink.

Third Embodiment

A liquid crystal display device according to a third embodiment of the present embodiment will be described with reference to FIG. 9. What has been described about the first embodiment or the second embodiment, if not described in connection with the present embodiment, applies to the present embodiment except under exceptional circumstances.

Figure 9:
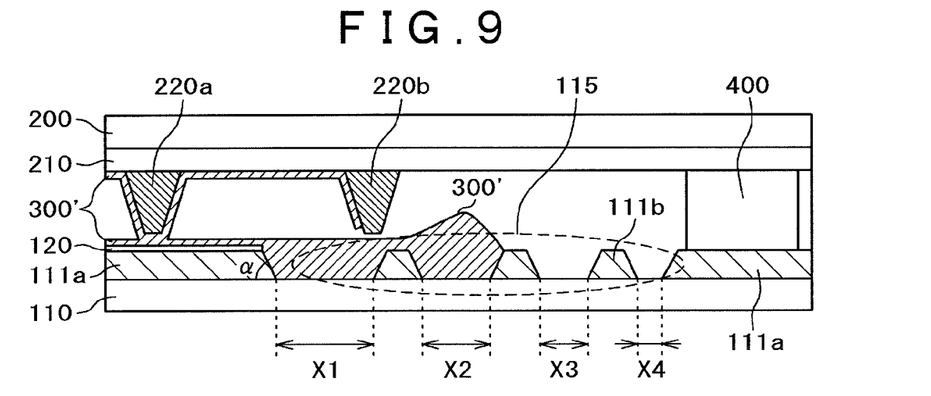
FIG. 9 is a schematic sectional view of a frame area of a liquid crystal display device according to a third embodiment of the present invention.

FIG. 9 is a schematic sectional view of a frame area of a liquid crystal display device according to the present embodiment. The TFT substrate has a groove structure 115 formed using a transparent organic insulation film 111a making up a lower layer. The groove structure 115 includes plural grooves (concave portions) formed to surround the outer periphery of the display area (quadruple grooves are provided in the present embodiment). In the flat portion near the display area, the transparent conductive film (ITO or IZO) 120 is formed. The inclined side portions and bottom portion of each groove (concave portion) are formed of the organic insulation film. The grooves (concave portions) each range from 2 μm to 1 mm in width. In the groove structure including plural grooves (concave portions), the grooves are gradually narrower, at least, in two stages, in the direction away from the display area. This groove structure restricts wet-spreading of the alignment film ink. As described above, the groove structure includes plural grooves (concave portions) each formed to surround the outer periphery of the display area with the widths of the grooves being gradually smaller in the direction away from the display area (i.e. the groove closest to the display area is the widest). This makes it possible to efficiently inhibit the alignment film ink from spreading. The groove structure has an effect of reducing the amount of excess alignment film ink spreading beyond the display area. Hence, forming a large groove to be closest to the display area can greatly reduce the excess amount of alignment film ink spreading beyond the display area. With a large groove formed to be closest to the display area, the amount of alignment film ink spreading across the large groove into the next groove is reduced. This enhances the effect of inhibiting the alignment film ink from wettingly spreading. In the present embodiment as illustrated in FIG. 9, groove width X1 is about 80 μm, X2 is about 50 μm, X3 is about 30 μm, and X4 is about 15 μm.

If the groove structure 115 is not provided, the edge portion of the alignment film ink ranges from 1 to 2 mm in width, that is, the edge portion cannot be accurately positioned. When the groove structure of the present embodiment is used, the edge portion of the alignment film ink can be positioned as desired within a width of 0.2 mm. In cases where inhibiting the alignment film ink from wettingly spreading results in degrading the flatness of the alignment film 300' as shown in FIG. 9, adopting a photo-alignment film will enable favorable alignment processing.

The CF substrate is structured such that a bank (wall-like projecting portion) 220b is formed, using the organic insulation layer for forming columnar spacers, to surround the outer periphery of the display area. In this structure, the alignment film ink is inhibited from wettingly spreading.

According to the present embodiment, grooves formed in an organic insulation film are provided, each groove being formed to be continuous to surround the display area. This makes it possible to provide a liquid crystal display device which is highly reliable even with a slim frame area. The grooves included in the groove structure are gradually narrower in the direction away from the display area. This enhances the effect of inhibiting the alignment film ink from wettingly spreading.

Fourth Embodiment

A liquid crystal display device according to a fourth embodiment of the present embodiment will be described with reference to FIG. 10. What has been described about the first to third embodiments, if not described in connection with the present embodiment, applies to the present embodiment except under exceptional circumstances.

Figure 10:
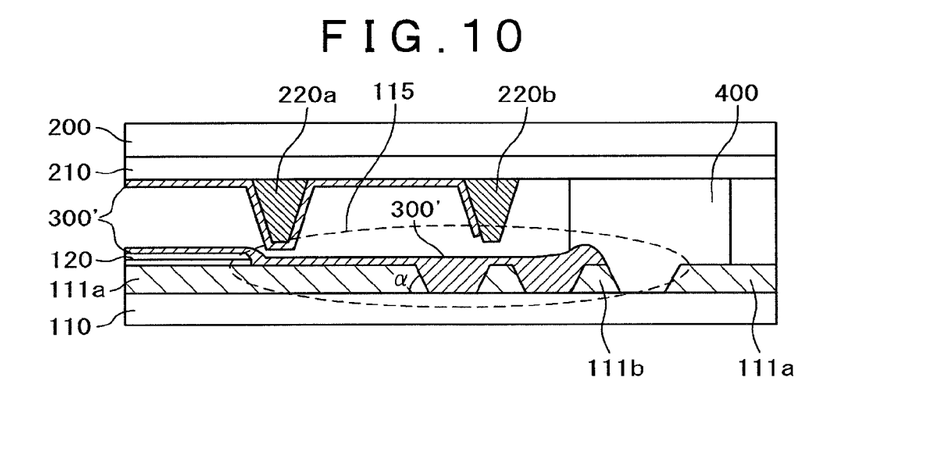
FIG. 10 is a schematic sectional view of a frame area of a liquid crystal display device according to a fourth embodiment of the present invention.

FIG. 10 is a schematic sectional view of a frame area of a liquid crystal display device according to the present embodiment. The TFT substrate has a groove structure 115 formed using a transparent organic insulation film 111a making up a lower layer. The groove structure 115 includes at least one groove (concave portion) formed to surround the outer periphery of the display area (triple grooves are provided in the present embodiment). In the flat portion near the display area, a boundary region between the transparent conductive film (ITO or IZO) 120 or an inorganic insulation film (SiNx or SiO) and the organic insulation film 111a is provided. The inclined side portions and bottom portion of each groove (concave portion) are formed of the organic insulation film. A sealant 400 is formed correspondingly to at least one of the grooves (or banks) such that part of the sealant 400 covers an end portion of the patterned alignment film, and the groove structure inhibits the alignment film ink from wettingly spreading. Referring to FIG. 10, angle α is about 50 degrees, and the grooves and bank-like projections are about 10 μm wide each.

If the groove structure 115 is not provided, the edge portion of the alignment film ink ranges from 1 to 2 mm in width, that is, the edge portion cannot be accurately positioned. When the groove structure of the present embodiment is used, the edge portion of the alignment film ink can be positioned as desired within a width of 0.1 mm. In cases where inhibiting the alignment film ink from wettingly spreading results in degrading the flatness of the alignment film 300' as shown in FIG. 10, adopting a photo-alignment film will enable favorable alignment processing.

The CF substrate is structured such that a bank (wall-like projecting portion) 220*b* is formed, using the organic insulation layer for forming columnar spacers, to surround the outer periphery of the display area. In this structure, the alignment film ink is inhibited from wettingly spreading.

According to the present embodiment, grooves formed in an organic insulation film are provided, each groove being formed to be continuous to surround the display area. This makes it possible to provide a liquid crystal display device which is highly reliable even with a slim frame area. Also, the structure in which the sealant is partly superposed over an end portion of the patterned alignment film is effective in making the frame area slimmer.

The present invention is not limited to the above embodiments and includes various modified embodiments. The above embodiments have been described in detail to make the present invention easily understandable, and not all the components of the above embodiments are necessarily required. Also, it is possible to change the structure of an embodiment by deleting a part of the structure of the embodiment, by adding a part of the structure of another embodiment, and/or by replacing a part of the structure of the embodiment with a part of the structure of another embodiment.

What is claimed is:

1. A liquid crystal display device including a first substrate, a second substrate and a seal for sealing liquid crystals between the first substrate and the second substrate, the first substrate having a display area in a center portion thereof and a frame area surrounding the display area as seen from perpendicularly above,
   wherein the frame area of the first substrate has a flat portion formed in an area close to the display area, the flat portion including a film stack which includes an organic insulation film, a transparent conductive film, and an alignment film stacked in this order, and a groove structure formed in the organic insulation film in an area away from the display area, the groove structure being continuous surrounding the display area,
   wherein the groove structure includes a first groove and a second groove located farther distance than the first groove from the display area, and
   wherein the second groove is narrower than the first groove.

2. The liquid crystal display device according to claim 1, wherein the groove structure includes a groove formed in the organic insulation film to be continuous from an edge portion of the transparent conductive film.

3. The liquid crystal display device according to claim 1, wherein the groove structure includes a groove formed to be continuous from a flat portion of the organic insulation film, the flat portion of the organic insulation film being provided, in the area away from the display area, to be continuous from the end portion of the transparent conductive film.

4. The liquid crystal display device according to claim 1, wherein the groove structure includes a plurality of grooves and projections which are uniform in width.

5. The liquid crystal display device according to claim 1, wherein the seal is formed to overlap the groove structure as seen from perpendicularly above the first substrate.

6. The liquid crystal display device according to claim 5, wherein an edge portion of the alignment film is formed to overlap the seal as seen from perpendicularly above the first substrate.

7. The liquid crystal display device according to claim 1, wherein the second substrate includes an alignment film formed thereon and a frame-shaped bank surrounding the display area, the frame-shaped bank being for inhibiting the alignment film from wettingly spreading.

8. The liquid crystal display device according to claim 7, wherein the frame-shaped bank is formed to overlap the groove structure as seen from perpendicularly above the first substrate.

9. The liquid crystal display device according to claim 1, wherein the alignment film is a photo-alignment film.

10. The liquid crystal display device according to claim 1, wherein the organic insulation film is less wettable than the transparent conductive film by an alignment film ink before being cured to form the alignment film.

11. A liquid crystal display device including a first substrate, a second substrate and a seal for sealing liquid crystals between the first substrate and the second substrate, the first substrate having a display area in a center portion thereof and a frame area surrounding the display area as seen from perpendicularly above,
   wherein the frame area of the first substrate has a flat portion formed in an area close to the display area, the flat portion including a film stack which includes an organic insulation film, a transparent conductive film, and an alignment film stacked in this order, and a groove structure formed in the organic insulation film in an area away from the display area, the groove structure being continuous surrounding the display area, and
   wherein the groove structure includes a plurality of grooves formed to be narrower with increasing distance from the display area.

12. A liquid crystal display device including a display area and a frame area surrounding the display area,
   wherein the frame area has a flat portion formed in an area close to the display area, the flat portion including a film stack which includes an organic insulation film, a transparent conductive film, and an alignment film stacked in this order, and a groove structure formed in the organic insulation film to be in an area away from the display area, the groove structure surrounding the display area, and
   wherein the groove structure includes a first groove and a second groove located farther distance than the first groove from the display area, the second groove being narrower than the first groove, and the first and the second grooves having discontinuous portions, the discontinuous portions being formed such that distance L between any two discontinuous portions of the first and the second grooves is larger than distance S between the first and the second grooves.

13. The liquid crystal display device according to claim 12, wherein the groove structure is formed to include at least triple grooves.

14. The liquid crystal display device according to claim 12, wherein the display area is rectangularly formed and the grooves have discontinuous portions only along a particular side of the display area.

15. The liquid crystal display device according to claim 12, wherein the alignment film is a photo-alignment film.

* * * * *